United States Patent
Kashyap (10) Patent No.: US 9,781,191 B2
(45) Date of Patent: *Oct. 3, 2017

(54) PROCESSING OF APPLICATION PEAK LOAD

(71) Applicant: International Business Machines Corporation, Armonk, NY (US)

(72) Inventor: Vivek Kashyap, Beaverton, OR (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/778,592

(22) Filed: Feb. 27, 2013

(65) Prior Publication Data

US 2013/0238690 A1 Sep. 12, 2013

Related U.S. Application Data

(63) Continuation of application No. 13/252,129, filed on Oct. 3, 2011.

(51) Int. Cl.
*G06F 15/16* (2006.01)
*H04L 29/08* (2006.01)
*G06F 9/50* (2006.01)

(52) U.S. Cl.
CPC ............ *H04L 67/10* (2013.01); *G06F 9/5083* (2013.01)

(58) Field of Classification Search
CPC .. G06F 15/173; G06F 15/17325; G06F 15/16; G06F 9/5083; H04L 67/10

(Continued)

(56) References Cited

U.S. PATENT DOCUMENTS 6,212,521 B1 * 4/2001 Minami et al. ............... 707/613
6,990,666 B2    1/2006 Hirschfeld et al.
(Continued)

FOREIGN PATENT DOCUMENTS

WO     2009111799     9/2009

OTHER PUBLICATIONS

Christian Vecchiola and Rajkumar Buyya, Aneka: A Software Platform for .NET-based Cloud Computing, 30 pages, Department of Computer Science and Software Engineering The University of Melbourne, Australia.

(Continued)

*Primary Examiner* — Krista Zele
*Assistant Examiner* — Tariq Najee-Ullah
(74) *Attorney, Agent, or Firm* — Kunzler Law Group; Steven L. Bennett (57) ABSTRACT

Methods may provide peak load processing on a computer system. A method may include receiving at a remote computer system a request from a local computer system, coupled to the remote computer system by a network, to replicate at the remote computer system a local instance of an application executing on the local computer system that is subject to user requests received at the local computer system. The method may further include replicating on the remote computer system a remote instance of the application and redirecting user requests from the local computer system to the remote computer system. The method may further include executing on the remote computer system the remote instance of the application, including processing with the remote instance of the application user requests redirected from the local computer system to the remote instance of the application.

18 Claims, 6 Drawing Sheets

(58) Field of Classification Search
USPC .................................................... 709/203
See application file for complete search history.

(56) References Cited

U.S. PATENT DOCUMENTS

| | | | |
|---|---|---|---|
| 7,197,519 B2* | 3/2007 | Nishikawa et al. | |
| 7,284,054 B2 | 10/2007 | Radhakrishnan | |
| 7,350,186 B2 | 3/2008 | Coleman et al. | |
| 7,596,620 B1 | 9/2009 | Colton et al. | |
| 7,617,217 B1* | 11/2009 | Chen et al. | |
| 8,271,653 B2 | 9/2012 | DeHaan | |
| 8,468,241 B1* | 6/2013 | Raizen et al. | 709/224 |
| 8,601,473 B1* | 12/2013 | Aron et al. | 718/1 |
| 8,738,756 B2* | 5/2014 | Kannan et al. | 709/223 |
| 8,863,124 B1* | 10/2014 | Aron | 718/1 |
| 8,937,953 B2* | 1/2015 | Hammer et al. | 370/392 |
| 2002/0165993 A1 | 11/2002 | Kramer | |
| 2003/0167295 A1* | 9/2003 | Choo | 709/104 |
| 2004/0030739 A1* | 2/2004 | Yousefi'zadeh | 709/201 |
| 2004/0111509 A1 | 6/2004 | Eilam et al. | |
| 2004/0230615 A1* | 11/2004 | Blanco et al. | 707/104.1 |
| 2005/0010677 A1 | 1/2005 | Krissell | |
| 2006/0230076 A1* | 10/2006 | Gounares | G06F 9/38 |
| 2006/0230245 A1* | 10/2006 | Gounares | H04L 41/22 711/170 |
| 2006/0248372 A1 | 11/2006 | Aggarwal et al. | |
| 2007/0078988 A1* | 4/2007 | Miloushev et al. | 709/227 |
| 2007/0179963 A1 | 8/2007 | Fujiyama et al. | |
| 2007/0244987 A1 | 10/2007 | Pedersen et al. | |
| 2008/0082575 A1 | 4/2008 | Peter et al. | |
| 2009/0063623 A1 | 3/2009 | Brown et al. | |
| 2009/0144393 A1 | 6/2009 | Kudo | |
| 2009/0276771 A1* | 11/2009 | Nickolov et al. | 717/177 |
| 2009/0288084 A1 | 11/2009 | Astete et al. | |
| 2009/0328077 A1 | 12/2009 | Kashyap | |
| 2010/0179941 A1 | 7/2010 | Agrawal et al. | |
| 2010/0191783 A1 | 7/2010 | Mason et al. | |
| 2010/0223385 A1 | 9/2010 | Gulley et al. | |
| 2010/0293147 A1 | 11/2010 | Snow et al. | |
| 2010/0306765 A1 | 12/2010 | DeHaan | |
| 2010/0325422 A1* | 12/2010 | Gnanasambandam | G06F 17/30082 713/153 |
| 2010/0332449 A1 | 12/2010 | Holenstein et al. | |
| 2010/0332847 A1 | 12/2010 | Johnson et al. | |
| 2011/0055396 A1 | 3/2011 | DeHaan | |
| 2011/0061110 A1 | 3/2011 | Koeten et al. | |
| 2011/0231899 A1* | 9/2011 | Pulier | G06F 9/45558 726/1 |
| 2011/0270899 A1* | 11/2011 | Chen | G06F 12/0253 707/816 |
| 2011/0270968 A1 | 11/2011 | Salsburg et al. | |
| 2012/0023066 A1 | 1/2012 | Bourbonnais et al. | |
| 2012/0084769 A1* | 4/2012 | Adi | G06F 8/63 717/174 |
| 2012/0137001 A1* | 5/2012 | Ferris | H04W 4/003 709/226 |
| 2012/0137003 A1* | 5/2012 | Ferris | H04W 4/003 709/226 |
| 2012/0215919 A1* | 8/2012 | Labat | G06F 9/5011 709/226 |
| 2012/0250682 A1* | 10/2012 | Vincent et al. | 370/390 |
| 2012/0250686 A1* | 10/2012 | Vincent et al. | 370/392 |
| 2012/0281708 A1* | 11/2012 | Chauhan | H04L 63/0272 370/401 |
| 2012/0284227 A1 | 11/2012 | Bourbonnais et al. | |
| 2012/0297238 A1 | 11/2012 | Watson et al. | |
| 2013/0007197 A1 | 1/2013 | Park | |
| 2013/0044636 A1* | 2/2013 | Koponen et al. | 370/254 |
| 2013/0111467 A1* | 5/2013 | Sundararaj | 717/176 |
| 2013/0132457 A1* | 5/2013 | Diwakar | G06F 9/5072 709/201 |
| 2013/0315253 A1* | 11/2013 | Hegland et al. | 370/400 |
| 2013/0322458 A1* | 12/2013 | Nagumo | H04L 45/28 370/401 |
| 2013/0339424 A1* | 12/2013 | Pasala et al. | 709/203 |
| 2014/0006581 A1* | 1/2014 | Raghu | 709/223 |
| 2014/0075013 A1* | 3/2014 | Agrawal et al. | 709/224 |
| 2014/0082166 A1* | 3/2014 | Robinson et al. | 709/223 |
| 2014/0082167 A1* | 3/2014 | Robinson et al. | 709/223 |
| 2014/0108665 A1* | 4/2014 | Arora et al. | 709/227 |

OTHER PUBLICATIONS

Michael Armbrust et al., Above the Clouds: A Berkeley View of Cloud Computing, Feb. 10, 2009, 25 pages, Electrical Engineering and Computer Sciences University of California at Berkeley.

Tim Dornemann et al., On-Demand Resource Provisioning for BPEL Workflows Using Amazon's Elastic Computer Cloud, 2009, 8 pages, 9th IEEE/ACM International Symposium on Cluster Computing and the Grid.

Matt Helsley, LXC: Linux container tools, Feb. 3, 2009, 12 pages.

Amazon Web Services Blog, Cloudbursting—Hybrid Application Hosting, http://aws.typepad.com/aws/2008/08/cloudbursting-.html, Aug. 28, 2008.

VMWare, Cloud Computing, http://www.vmware.com/solutions/cloud-computing/, First retrieved May 26, 2009.

U.S. Appl. No. 13/252,129, Final Office Action, Mailed Jan. 6, 2014.

U.S. Appl. No. 13/252,129, Office Action, Mailed Jan. 21, 2015.

U.S. Appl. No. 13/252,129, filed Oct. 3, 2011, Final Office Action mailed Sep. 11, 2015.

U.S. Appl. No. 13/252,129, filed Oct. 3, 2011, Office Action mailed Aug. 11, 2016.

* cited by examiner

PROCESSING OF APPLICATION PEAK LOAD

CROSS-REFERENCE TO RELATED APPLICATION

This application is a continuation of U.S. patent application Ser. No. 13/252,129, filed Oct. 3, 2011, which is incorporated herein by reference in its entirety for all purposes.

BACKGROUND

The present invention relates to application load processing, and more specifically, to application load processing including a local instance of the application and a remote instance of the application.

A computer system executing an application having a workload may experience workload peaks that the computer system is not able to process in compliance with predefined service level objectives. When processing performance is degraded sufficiently, resources may be added to the computer system so that it is capable of meeting the service level objectives. Depending on the fluctuations in workload, this may result in substantial underutilization of some resources during off-peak times.

BRIEF SUMMARY

According to one embodiment of the present invention, a method may include receiving at a remote computer system a request from a local computer system, coupled to the remote computer system by a network, to replicate at the remote computer system a local instance of an application executing on the local computer system that is subject to user requests received at the local computer system. The method may further include replicating on the remote computer system a remote instance of the application and redirecting user requests from the local computer system to the remote computer system. The method may further include executing on the remote computer system the remote instance of the application, including processing with the remote instance of the application user requests redirected from the local computer system to the remote instance of the application.

In another embodiment of the present invention, a method may include executing at a local computer system a local instance of an application and receiving at the local computer system user requests for use of the application. The method may further include processing with the local instance of the application a first portion of the received user requests and sending to a remote computer system, operatively coupled to the local computer system by a network, a second portion of the received user requests.

DETAILED DESCRIPTION

As will be appreciated by one skilled in the art, aspects of the present invention may be embodied as a system, method or computer program product. Accordingly, aspects of the present invention may take the form of an entirely hardware-based embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

As is discussed further below, in some examples the present invention may include offloading a business's workload to the cloud, however the cloud is deployed. The business might itself be making its applications available to end users over a network but may not offer any cloud services itself. For example, it might be as simple as hosting an application for taking orders for a flower delivery. This might get overwhelmed during peak times—say Valentines Day—at which time all or a portion of the workload may be offloaded to a replication of the base application in the cloud.

Figure 1:
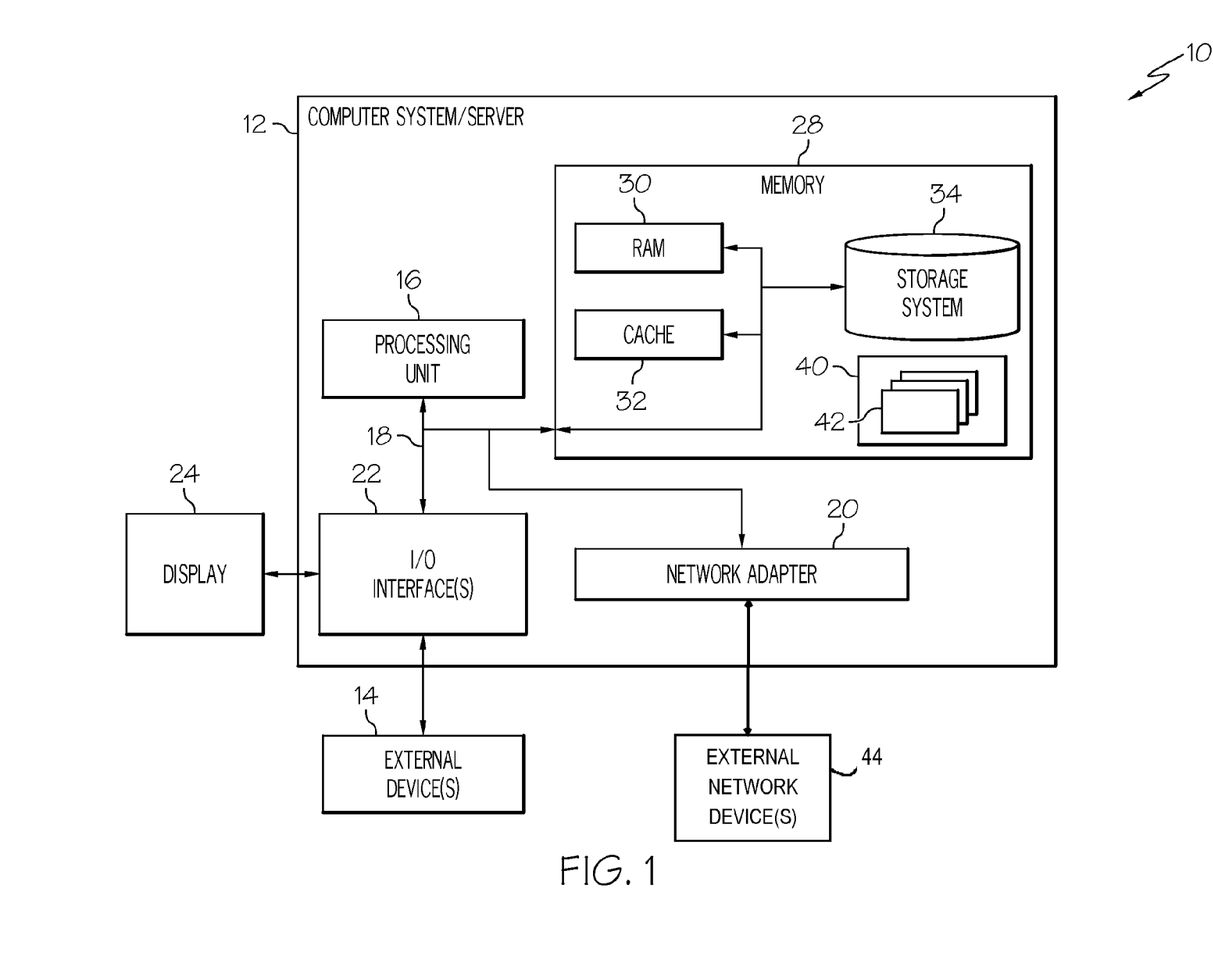
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth herein above and below.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown separately and typically called a "hard drive"). Although also not shown separately, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be included in storage system 34. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more network devices 44 external to cloud computing node 10 over network communication lines of one or more networks such as a local area network (LAN), a general wide area network (WAN), and/or a public network (e.g., the Internet) via a network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
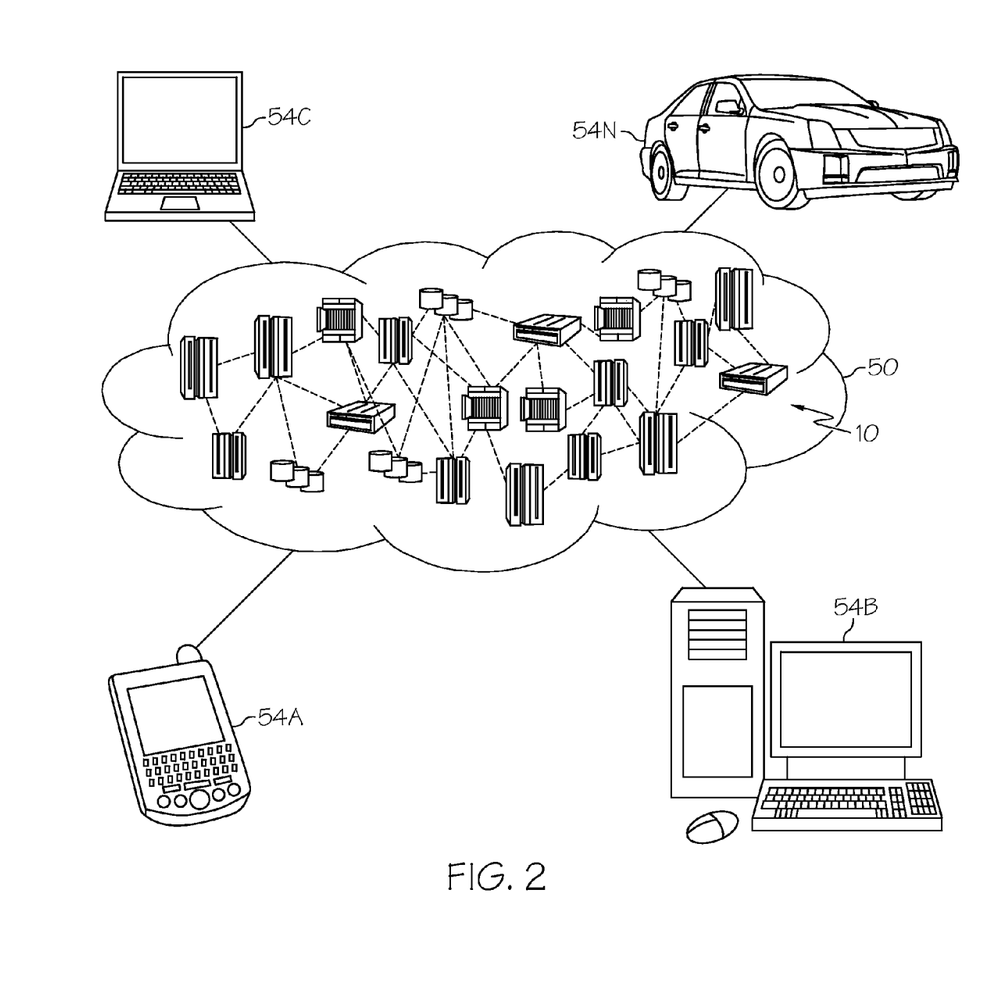
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop, personal, or server computer or computer system 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
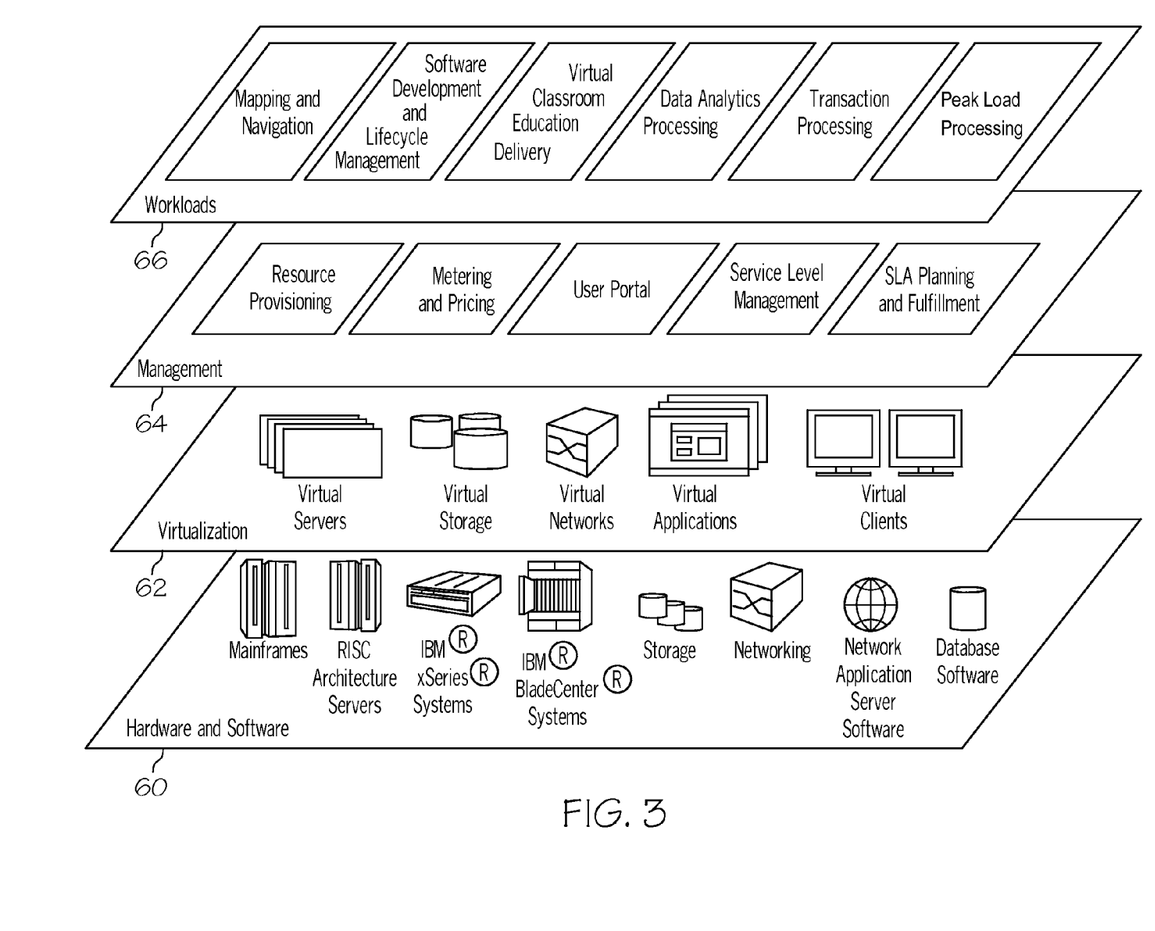
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and peak load processing.

In general, peak load processing functionality may include a dynamic cloud for processing a peak workload of an application. A customer system, for example a computer for a small business, may have certain workload peaks that by themselves do not justify investment in additional hardware. However, ignoring those workload peaks may result in loss of revenue. Peak load processing functionality may include the dynamic cloud replicating the application and shrinking the application back to the customer system after the overload period with all data made available for audit and bookkeeping.

Figure 4:
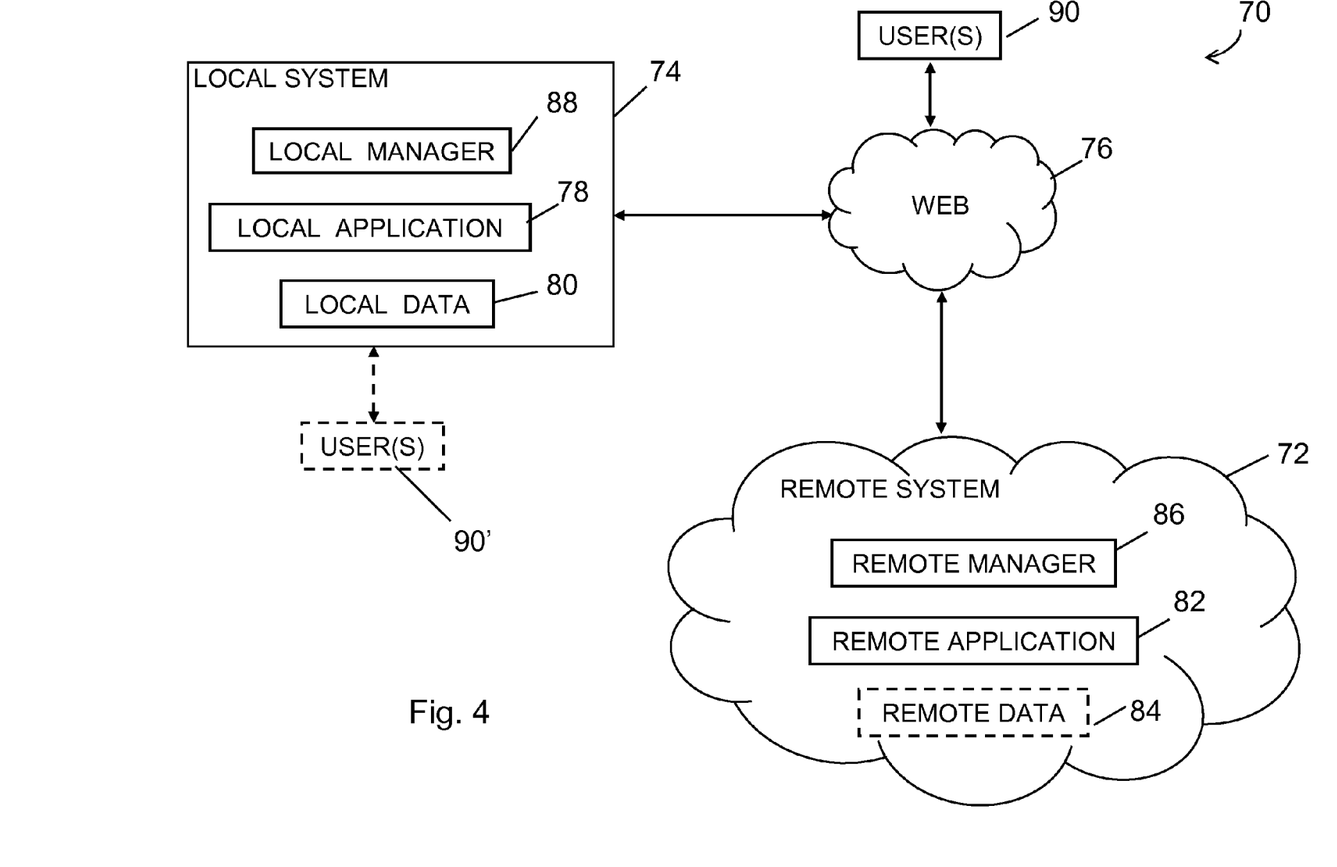
FIG. 4 depicts a peak load processing environment according to an embodiment of the present invention.

Referring now to FIG. 4, an exemplary peak load processing environment 70 is shown including a remote computer system 72, also referred to herein as a first computer system. A local computer system 74, also referred to herein as a second computer system and/or a customer computer system, may be coupled to remote system 72 by a network, for example web 76. Remote system 72 and/or local system 74 may be examples of a computer system having the components of cloud computing node 10 described above, with each including a processor, such as processing unit 16, and a memory storage device, such as memory 28, operatively coupled to the processor, the memory storage device storing instructions that make up a program 40 that is executed by the processor.

An application may be developed by a developer using resources from remote system 72. The developed application may be made available in an application store. Local system 74 may download a first instance of the application, also referred to as a local application 78, from the application store. Local application 78 may be subject to requests sent by a user on a user computer 90 related to the application and received at local system 74 and may be further associated with local data 80. User computers may be connected to web 76, may be local to the local computer system, as represented by user computer 90' shown in dashed lines, may be a part of local computer system 74, or may be a combination of these types of user computers.

Remote system 72 may receive from local system 74 a request to replicate, at remote system 72, local application 78 that is executing on local system 74. A remote instance of the application, or remote application 82, may be replicated on remote system 72 and may be executed on remote system 72.

In some embodiments, termination of the execution of local application 78 may be initiated. A copy of the application and configuration of local application 78 may be received after local application 78 has terminated.

Execution of remote application 82 may include processing with remote application 82 user requests, which may be received from local system 74 or may otherwise be directed to remote system 72, and may further include data associated with remote application 82, or remote data 84.

The execution of remote application 82 may be monitored by a remote manager 86 and/or a local manager 88. Additionally and/or alternatively, the execution of local application 78 may be monitored by remote manager 86 and/or local manager 88. For example, in response to reaching an operation threshold, an indication related to the reaching of the operation threshold may be sent to local system 74. Local system 74 may be provided with remote data 84. In some embodiments, local system 74 may be sent responses produced by the application to the received user requests. The responses may be sent for redirection to users 90 that submitted the corresponding user requests.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 5:
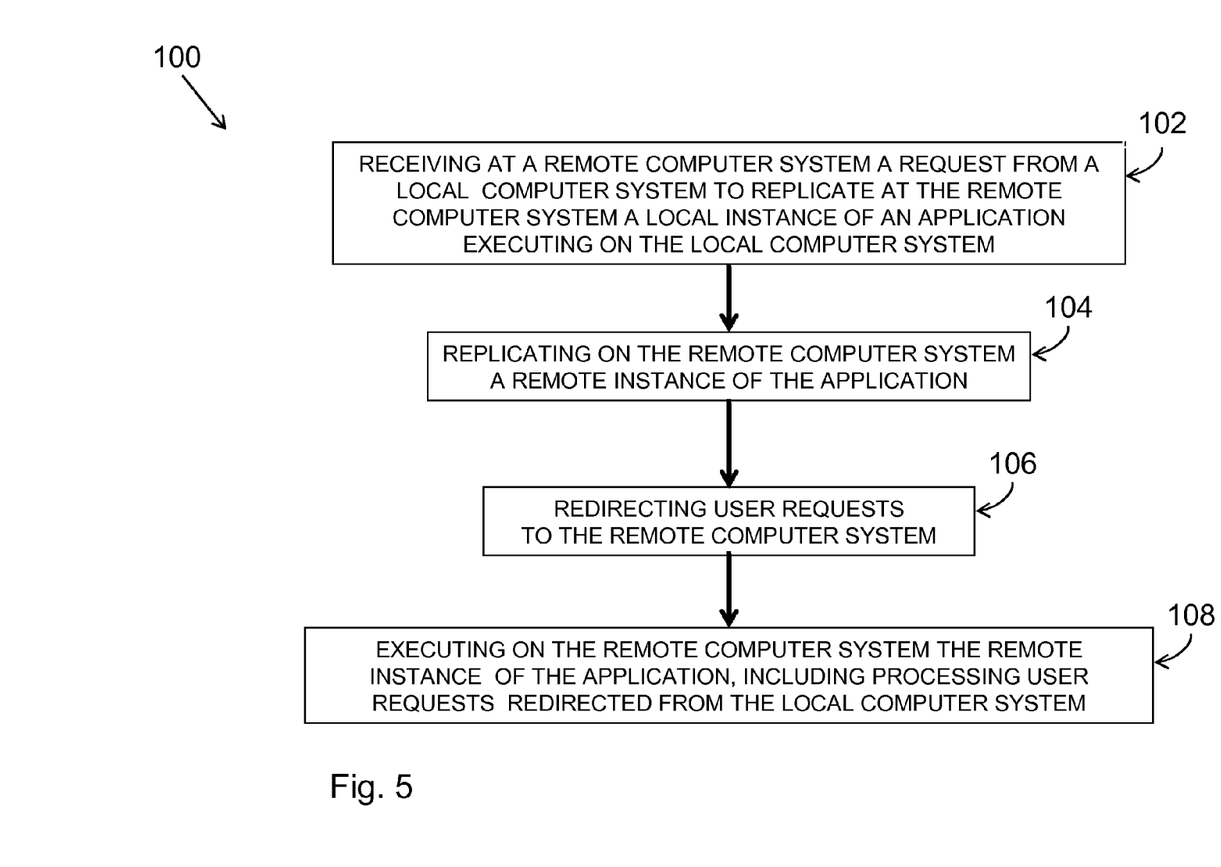
FIG. 5 is an example of a method according to an embodiment of the present invention.

With reference now to FIG. 5, an example of a method is shown. While FIG. 5 shows exemplary steps of a method 100 according to one embodiment, other embodiments may omit, add to, and/or modify any of the steps shown in that figure. Step 102 may include receiving at a remote computer system a request from a local computer system, coupled to the remote computer system by a network, to replicate at the remote computer system a local instance of an application executing on the local computer system that is subject to user requests received at the local computer system. Step 104 may include replicating on the remote computer system a remote instance of the application. Step 106 may include redirecting user requests from the local computer system to the remote computer system. Step 108 may include executing on the remote computer system the remote instance of the application, including processing with the remote instance of the application user requests redirected from the local computer system to the remote instance of the application.

Method 100 may include other steps. For example, method 100 may include monitoring the execution of the remote instance of the application, and in response to reaching an operation threshold, sending to the local computer system an indication related to the reaching of the operation threshold. Additionally and/or alternatively, method 100 may include providing the local computer system with data associated with the remote instance of the application. Method 100 may also include sending to the local system responses produced by the application to the received user requests for redirection to the users that submitted the corresponding user requests.

In some embodiments of method 100, replicating on the remote computer system a remote instance of the application running on the local system includes initiating termination of the execution of the local instance of the application, and receiving a copy of the application and configuration of the local instance of the application after the local instance of the application has terminated. Additionally and/or alternatively, in some embodiments of method 100, where the local computer system is coupled to the Internet, associated with a domain having a DNS entry providing access by users, and wherein redirecting user requests from the local computer system to the remote computer system includes dynamically assigning the domain to a DNS entry of the remote computer system. Additionally and/or alternatively, in some embodiments of method 100, replicating on the remote computer system a remote instance of the application includes replicating a data base of the local computer system on the remote computer system.

Figure 6:
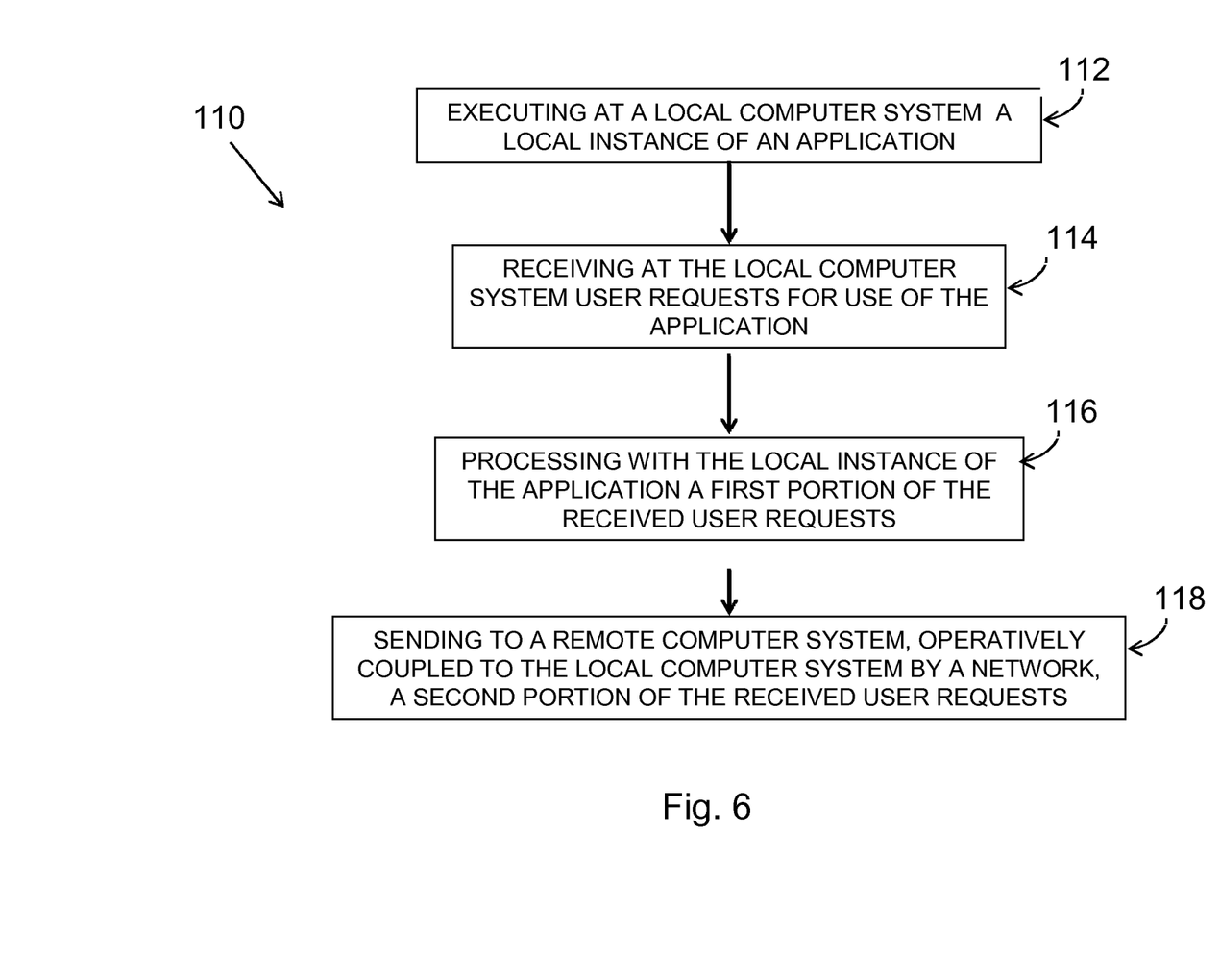
FIG. 6 is an example of a method according to an embodiment of the present invention.

Referring now to FIG. 6, a further example of a method is shown. While FIG. 6 shows exemplary steps of a method 110 according to one embodiment, other embodiments may omit, add to, and/or modify any of the steps shown in that figure. Step 112 may include executing at a local computer system a local instance of an application and step 114 may include receiving at the local computer system user requests for use of the application. Step 116 may include processing with the local instance of the application a first portion of the received user requests. Step 118 may include sending to a remote computer system, operatively coupled to the local computer system by a network, a second portion of the received user requests.

Method 110 may include other steps. For example, method 110 may include monitoring the processing of the received user requests at the local computer system, and wherein the second portion of the received user requests are sent to the remote computer system in response to the reaching of an operation threshold. Additionally and/or alternatively, method 110 may include, prior to sending the second portion of the received user requests, terminating the executing of the local instance of the application at the local computer system, and wherein sending to the remote computer system the second portion of the received user requests includes sending all of the user requests to the remote computer system while the local instance of the application is terminated.

Some embodiments of method 110 may include receiving at the local computer system data associated with the remote instance of the application. Some embodiments of method 110 may include receiving from the remote computer system responses to user requests sent to the remote computer system, and sending the received responses to the users that submitted the corresponding user requests.

Additionally and/or alternatively, some embodiments of method 110 may include sending a copy of the application and configuration of the local instance of the application to the remote computer system, and prior to sending to the remote computer system the second portion of the received user requests, receiving an indication from the remote computer system that a remote instance of the application has been provisioned at the remote computer system. Some embodiments of method 110 may include providing access by the remote computer system to a data base of the local computer system.

The above-described systems and methods may be provisioned in a container-based development cloud for integrated testing and development of applications. Once tested, the applications may be moved to an application store. The application store may provide a customer with a dynamic cloud backup for workload peaks (say during Christmas for special orders). During this peak time, the customer system may be replicated and integrated into a virtual cloud. The system may then shrinks back to premises after the peak is crossed with all data made available for audit and book-keeping.

To enable this, a joint Local Test Cabinet (LTC)/Server Message Block (SMB) development effort may be used. A development cloud may be provided to independent software vendors (ISVs) for development and testing of the ISV's applications. This may allow common utilities and verification to be automatically included into the application development process. Once verified, the applications may be automatically moved to the application store.

For example, Linux or other operating system containers may be enabled in operating system products, such as SUSE Linux Enterprise Server (SLES) 11, and Red Hat Enterprise Linux (RHEL) 6. The Linux Containers may then be used to form the basis for the application development.

Linux containers may be used as the virtualization platform for the applications. Linux containers may provide automatic isolation for the applications, allowing multiple isolated environments with negligible overhead. This multitenancy may not require separate network port mapping, or configuration setup. Resource and application management may be provided using standard tooling available with Linux distributions or distros and with a system director, such as Common Information Model (CIM) instrumentation. Linux containers may also allow for packaging the applications as Open Virtualization Format (OVF) appliances, enabling a well defined mechanism for install, configuration and updates. With Linux Containers, one may upgrade applications while running the older version or copying over the configuration. Linux containers may also allow for replicating the application state (application checkpoint/restart) or static replication of the application into the cloud. Unlike for a virtual machine (VM), containers only involve replication or transfer of the application state or only the application may be instantiated from an application store, if available. One does not need to create a full VM with an independent OS instance.

Criteria may be applied to establish when the remote instance of the application should be provisioned. A component, such as a management application, may monitor the system and/or application utilization and continuously compare a system metric, such as a user response time against a policy or a baseline gathered over time. This may be provided in a local manager 88 of a local computer system 74, or a remote manager 86 of a remote computer system 72. If the response time deviates more than a certain rate, such as three times within a given time period from a baseline or crosses a threshold defined by the policy, the management application may send an alert to remote system 72 using an appropriate program, such as IBM® early, cloud and company (ECC) messaging server software, backing up the small business deployment or the customer server deployment.

The alert may prompt freezing of the application and taking a snapshot, or other credentials of the application and configuration being used, to create a copy. The copy may be provisioned as a remote application 82 on remote system 72 and a load-balancer component, such as local manager 88, may be invoked on local system 74 at the customer premises, or remote manager 86 of remote system 72. A tunnel may be setup to remote system 72 functioning as a cloud virtual machine (VM) such that the incoming workload is load-balanced across local system 74, which may be the local SMB system, the local customer system, or the local small business system, and the cloud backed provisioned VM at remote system 72. Other mechanisms for load-balancing might include moving all processing to the remote system.

A console to the remote system may also be provided to an administrator of the customer server along with an alert on the provisioning at remote system 72. If performance on remote system 72 measured relative to Service Level Agreements (SLAs) drops below a threshold, or manually, the data may be consolidated back to the customer server, along with audit logs.

Following is an example of a migration mechanism. A customer may receive internet access from an Internet Service Provider (ISP) with limited upload speeds and somewhat better download speeds. Therefore, the conditions for migration may be different in at least three ways:

i) The cloud and customer premises are in different IP domains.

ii) There are link speeds and bandwidth limitations. For example Dense wavelength division multiplexing (DWDM)/Synchronous optical networking (SONET) at OC12 is 622 Mbps, whereas Verizon® offers premier 20 Mbps upload speeds.

iii) The customer or small business local system has a Domain Name Service DNS entry provided by the ISP, though the IP address might not always stay constant. Therefore, the systems within the domain are allocated addresses on a local subnet (192.168.x.y) with Network Address Translation (NATing) done by a router, as is common with home networking.

A VM generally has a much larger footprint (OS+application data and memory), than that of a container (just the application). This lower bandwidth requirement may be more suited to the bandwidth requirements available to a small business or other customer. The container may be bridged to the local subnet and receives an address within the local domain (192.168.h.k). E.g. The DNS entry will point to the ISP allocated address a.b.c.d with the domain www.mybusiness.com.

When the application threshold is reached, there may be multiple options for replicating the task or application in the cloud:

i) The server application may be downloaded from the cloud and multiple instances can be run in parallel. Therefore, a copy of the application can be instantiated in the cloud, such as at remote system 72, without any transfer of data or application state or snapshot.

ii) The application may be replicated but needs configuration information as set up on the customer server. In this example, the application may be downloaded from the cloud or pre-installed as virtual appliances in OVF format. Customizations may be re-recorded in the OVF metadata for future migrations or the OVF environment file is stored. Additionally, the instantiation in remote system 72 may be accomplished by applying the customizations to the instance in the remote system 72.

iii) The application itself may be migrated. This may include checkpointing the application and restarting in remote system 72. An application snapshot may be taken with the application state migrated. The application IP address may not be unbound from the source server in local system 74 at the customer premises though, to avoid the remote peer receiving a Transmission Control Protocol (TCP) reset while the migration is in progress. However, all data on that port is preferably dropped. Instead of a checkpoint and restart, one could implement live migration. In another example, the two local and remote computer systems may be treated as part of the same overall cloud. A single IP domain includes both computer systems even if they are separated by a large geographical distance. IP renumbering may introduce routing complications that this approach may avoid. Also, VMs may be connected over long distances by a LAN to provide direct migration. This layer2 extension may be provided using Mulitprotocol Label Switching (MPLS), Virtual Private LAN Service (VPLS), or DWDM mechanisms.

Thus, the application may be restarted in remote system 72 with the same local address (192.168/16 subnet) but NATted behind a Cloud IP address (say 9.x.x.x).

The deployment, which may be a value add on, at the customer or small business server in local system 74, and may further invoke a load-balancer in local manager 88 that forwards all requests to the cloud address(es) to the remote application instances in the cloud.

In some examples, the DNS entry may be updated, such as with Dynamic DNS. In such examples, when the threshold is reached, the domain (e.g. www.myaddress.com) may be reassigned to the address of remote system 72. The current sessions may then continue with local application 78 on the original host (server on customer premises) in local system 74, while newer requests go to the remote system. The load-balancing in this example is entirely within remote system 72.

Exemplary data storage options may include one or more of the following:

a) Internet Small Computer System Interface (iSCSI), b) Fiber channel over IP (FCIP), c) Network File System (NFS) across subnets, d) an agent on the local server in local system 74 located at the customer premises that handles file system requests on behalf of remote application 82, e) replicate database/storage (local data 80) across to remote data 84 in remote system 72, and f) remote disk replication, such as that provided by the proprietary Digital Radio Development Bureau (DRDB).

The above set of solutions can be applied to a Kernel virtual machine (KVM) or VMware hypervisor based applications at a remote system, too, however the image size that is migrated may increase.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method comprising:

monitoring utilization of a local instance of an application on a local computer system coupled to a remote computer system by a network;

receiving at the remote computer system a request from the local computer system to replicate at the remote computer system the local instance of an application executing on the local computer system that is subject to user requests received at the local computer system in response to determining a utilization of the second computer system exceeds a predefined operation threshold of the second computer system, wherein the predefined operation threshold comprises a response time that is longer than a baseline response time, the baseline response time comprising recorded response times within the second computer system;

receive at the remote computer system an instance of the application executing on the local computer system from a remote repository in an Open Virtualization Format ("OVF"), the remote repository storing a plurality of applications executing on the local computer system, the plurality of applications being developed and tested within a container-based development cloud using resources of the remote computer system prior to being stored in the remote repository;

receiving on the remote computer system application configuration information stored in OVF metadata by the local computer system, the application configuration information comprising data for configuring the instance of the application on the remote computer system to have customizations that correspond to customizations of the instance of the application executing on the second computer system;

replicating on the remote computer system the instance of the application using the application configuration information from the local computer system;

redirecting user requests from the local computer system to the remote computer system; and executing on the remote computer system the remote instance of the application, including processing with the remote instance of the application user requests redirected from the local computer system to the remote instance of the application.

2. The method according to claim 1, further comprising providing the local computer system with data associated with the remote instance of the application.

3. The method according to claim 1, further comprising sending to the local system responses produced by the application to the received user requests for redirection to the users that submitted the corresponding user requests.

4. The method according to claim 1, wherein replicating on the remote computer system a remote instance of the application running on the local system includes initiating termination of the execution of the local instance of the application, and receiving a copy of the application and configuration of the local instance of the application after the local instance of the application has terminated.

5. The method according to claim 1, wherein the local computer system is coupled to the Internet, associated with a domain having a DNS entry providing access by users, and wherein redirecting user requests from the local computer system to the remote computer system includes dynamically assigning the domain to a DNS entry of the remote computer system.

6. The method according to claim 1, wherein replicating on the remote computer system a remote instance of the application includes replicating a data base of the local computer system on the remote computer system.

7. The method according to claim 1, wherein the operation threshold comprises a response time of three times one of a threshold defined in a policy and a baseline response time, the baseline response time recorded response times within the local computer system.

8. The method according to claim 1, further comprising receiving new user requests from the local computer system and executing the new user requests on the remote computer system, the new user requests received after receiving the application information, wherein the remote computer system and the local computer system are connected through a router accessed at an Internet Protocol ("IP") address and each of the remote computer system and the local computer system include a subnet address such that the new user requests received on the IP address and intended for the local computer system are forwarded to the remote computer system.

9. The method according to claim 8, wherein at least a portion of requests received by the local computer system prior to receiving the application are executed on the local computing system while new requests are executed on the remote computer system.

10. The method according to claim 1, wherein the remote instance of the application is executed within an operating system container on the remote computer system, the remote computer system comprising a plurality of operating system containers executing on an operating system for the remote computer system.

11. The method according to claim 1, wherein the network coupling the remote computer system and the local computer system comprises a bandwidth limitation such that an amount of data sent from the local computer system to the remote computer system for a predetermined period of time does not exceed the bandwidth limitation.

12. The method according to claim 1, wherein the operating system container on the remote computer system is bridged to a local subnet of the local computer system, the operating system container receiving an Internet Protocol ("IP") address associated with an IP domain for the local computer system.

13. A method comprising:
executing at a local computer system a local instance of an application;
receiving at the local computer system user requests for use of the application;
processing with the local instance of the application a first portion of the received user requests;
monitor utilization of the local instance of the application on the local computer system;
receiving, in response to determining a utilization of the local computer system exceeds a predefined operation threshold of the local computer system, at a remote computer system coupled to the local computer system by a network, an instance of the application executing on the local computer system from a remote repository in an Open Virtualization Format ("OVF"), the remote repository storing a plurality of applications executing on the local computer system, the plurality of applications being developed and tested within a container-based development cloud using resources of the remote computer system prior to being stored in the remote repository, wherein the predefined operation threshold comprises a response time that is longer than a baseline response time, the baseline response time comprising recorded response times within the second computer system;
sending to the remote computer system application configuration information from the local computer system stored in OVF metadata, the application configuration information comprising data for configuring the remote instance of the application executing on the remote computer system to have customizations that correspond to customizations of the local instance of the application executing on the local computer system;
replicating on the remote computer system a remote instance of the application using the application information from the local computer system;
executing on the remote computer system the remote instance of the application, including processing with the remote instance of the application user requests received from the local computer system, the remote instance of the application being executed within an operating system container executing on the remote computer system; and
sending to the remote computer system a second portion of the received user requests to be processed by the remote instance of the application on the remote computer system.

14. The method according to claim 13, further comprising, prior to sending the second portion of the received user requests, terminating the executing of the local instance of the application at the local computer system, and wherein sending to the remote computer system the second portion of the received user requests includes sending all of the user requests to the remote computer system while the local instance of the application is terminated.

15. The method according to claim 13, further comprising receiving at the local computer system data associated with the remote instance of the application.

16. The method according to claim 13, further comprising receiving from the remote computer system responses to user requests sent to the remote computer system, and sending the received responses to the users that submitted the corresponding user requests.

17. The method according to claim 13, further comprising, prior to sending to the remote computer system the second portion of the received user requests, receiving an indication from the remote computer system that a remote instance of the application has been provisioned at the remote computer system.

18. The method according to claim 13, further comprising providing access by the remote computer system to a database of the local computer system.

\* \* \* \* \*